Feb. 26, 1946. C. R. ALDEN 2,395,707
SPEED CONTROL MECHANISM
Filed Feb. 4, 1943 2 Sheets-Sheet 2
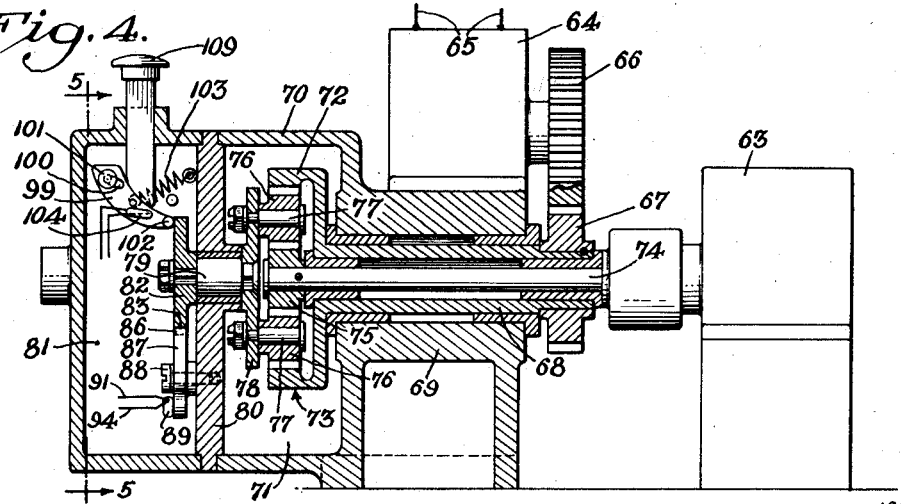
Inventor
Carroll R. Alden
BY
Parker, Carton, Pitzner & Hubbard
Attorneys.

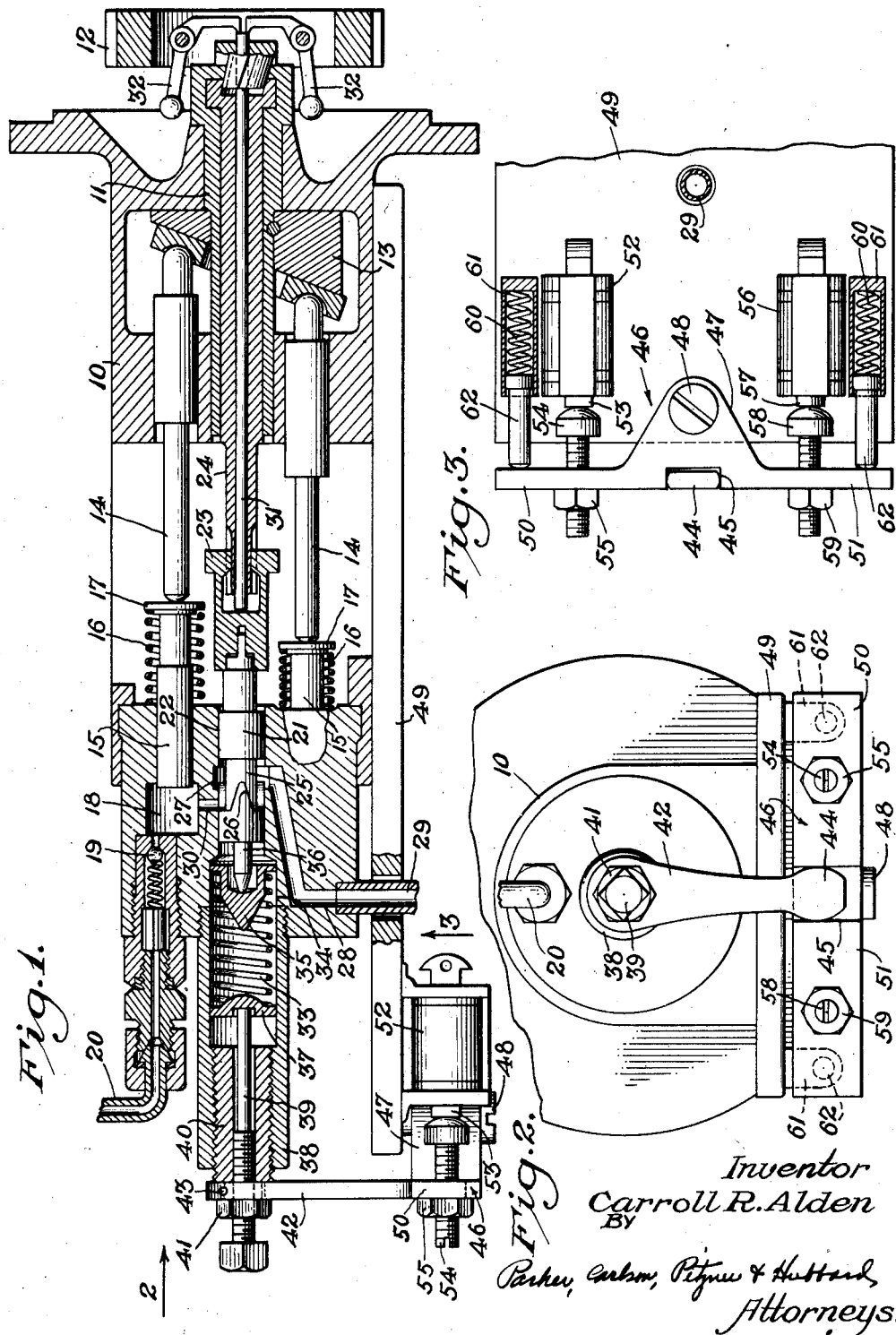

Patented Feb. 26, 1946

2,395,707

UNITED STATES PATENT OFFICE 2,395,707

SPEED CONTROL MECHANISM

Carroll R. Alden, Detroit, Mich., assignor to Ex-Cell-O Corporation, Detroit, Mich., a corporation of Michigan Application February 4, 1943, Serial No. 474,702

16 Claims. (Cl. 290—40)

My invention relates to a speed control mechanism and is concerned primarily with the automatic, close speed regulation of a prime mover connected to an alternating current generator so that the frequency of the generator will be regulated within limits acceptable for the operation of synchronous motor driven clocks and other electrical timing devices that are connected to the circuit supplied by the generator.

In large central generating stations, the frequency of the alternators is generally indicated by a synchronous motor driven clock which is connected in the alternator circuit and by comparing this clock with an independently driven master clock having the required accuracy, it is possible to ascertain whether the station frequency is above or below the required frequency for clocks floated on the system. Any adjustment is accomplished by remote alteration of the engine or turbine governors under the control of one or more operators depending upon the size of the station. No satisfactory automatic regulating device has yet been developed for large central stations.

In communities which are served by relatively small stations, it is just as important to regulate station frequency for the same purpose, but manual adjustment is economically unsound in relation to the output of the station. The continuous, automatic regulation of the small station frequency has therefore been a serious problem. The users of electric current in such locations are also users of motor driven clocks, but an electrical system in which the clocks gain time when the station frequency is above standard and which lose time when the frequency is below standard is obviously not a satisfactory arrangement.

It is therefore the principal object of my invention to provide a speed control mechanism which automatically and continuously regulates with acceptable accuracy the speed of a prime mover and hence the frequency of a connected alternating current generator.

This and further objects of my invention will be set forth in the following specification, reference being had to the accompanying drawings, and the novel means by which said objects are effectuated will be definitely pointed out in the claims.

In the drawings:

Figure 1 is a longitudinal, sectional elevation of the metering pump of an oil burning engine forming part of an engine-generator set and showing my improved speed control applied thereto.

Figs. 2 and 3 are views looking in the direction of the arrows 2 and 3, respectively, in Fig. 1 showing certain details of the control.

Fig. 4 is a longitudinal, sectional elevation of a differential mechanism forming part of the control.

Fig. 5 is a section along the line 5—5 in Fig. 4.

Fig. 6 is a diagram of the electrical circuit involved.

Fig. 7 is an enlarged fragmentary sectional elevation of the left end of the mechanism illustrated in Fig. 4 showing the means for resetting the mechanism.

My improved speed control will be described in connection with an oil burning engine which is connected to a generator (not shown) whose frequency is adjusted to a standard speed by controlling the speed of the engine within narrow limits. It will be understood, however, that the generic aspects of the invention are directed to any type of prime mover.

Referring to Figs. 1–3, inclusive, the numeral 10 designates the housing of the metering pump of an oil burning engine (not shown) having journaled therein a sleeve shaft 11 on one end of which is secured a gear 12 that may be driven from any convenient part of the engine. Also secured to the shaft 11 is a swash plate 13 which provides reciprocating movement for a plurality of actuating rods 14 that are slidably mounted in the housing 10 and of which there is one for each engine cylinder. Each rod 14 actuates a pump plunger 15 in a discharging direction, i. e., toward the left as viewed in Fig. 1, and return strokes of the plunger are accomplished by a helical spring 16 which encircles the plunger, one end abutting against a convenient portion of the housing 10 and the opposite end against a flange 17 secured to the end of the plunger and against which the rod 14 bears. During discharge movements of the plunger 15, oil that has accumulated within the pump chamber 18 is forced through a ball check valve 19 into a fuel line 20 leading to one of the engine cylinders. Control over the amount of fuel discharged to each engine cylinder is exercised by a valve 21 which is rotarily and reciprocably mounted in a bore 22 in the housing 10 that is coaxial with the shaft 11. The right end of the valve is drivably connected to one end of a coupler 23 whose opposite end has a driving connection with the splined end of a shaft 24 which is journaled within the sleeve shaft 11 and driven thereby. The intermediate portion of the valve 21 is reduced in diameter to provide an annular belt 25 which is only interrupted by a longitudinally extending tapered land 26. The belt is always in communication with an annular groove 27 formed in the bore 22 and to which fuel is supplied through a passage 28 in the housing which communicates with a pipe 29 that may be connected to any convenient source of fuel supply such as a pump (not shown). Communication between the chamber 18 and the belt 25 is effected by a port 30 and the amount of the fuel delivered to the chamber depends upon the axial position of the land 26 with respect to the port. Oil at constant pressure is always present in the belt 25 and hence as the valve 21 is moved toward the right more fuel will be discharged by the plunger 15 into the line 29, and the contrary condition will exist when the valve is moved in the opposite direction.

It will be understood that the valve 21 operates in timed relation to the several plungers 15 and axial shifts of the valve toward the left, i. e., in the direction which decreases the amount of fuel delivered to each cylinder, is accomplished by a rod 31 which extends coaxially through the shaft 24, the left end of the rod being received within and abutting a wall on the coupler 23, while the right end extends beyond the shaft 24 for engagement with the ends of a plurality of weighted levers 32 each of which is pivotally mounted on the gear 12. The valve 21 is urged in the opposite direction by a helical spring 33 whose right end is received within a bore 34 in the housing 10 coaxial with the bore 22 and within which is slidably mounted an abutment 35 against which the right end of the spring bears. An extension 36 projecting from the left end of the valve 21 bears against the abutment 35 and the spring 33 is adjustably loaded by means of a follower 37 slidable within a sleeve 38 that is threaded in the housing 10. The follower 37 is contacted by an adjusting screw 39 whereby the follower may be shifted to any desired position depending upon the loading to be applied to the spring 33 and this screw is threaded in a bushing 40 which in turn is threaded in the sleeve 38. The adjusted position of the screw 39 may be secured by a lock nut 41.

So far as described, the structure is substantially identical with the metering pump disclosed in my United States Letters Patent 2,156,933, and in this connection it will be understood that the spring 33 may be manually adjusted to secure any desired standard speed of the engine at some predetermined load, and therefore constitutes the primary control feature of my improved mechanism. However, in view of the fact that the control is intended to automatically maintain the standard speed of the engine despite variations in the load so that the frequency of a driven generator can be controlled within sufficiently narrow limits to enable electric clocks to be floated on the generator system, it is necessary to provide secondary means which are automatically operable to restore the standard speed of the engine in the event of changes in the engine load. The mechanism for accomplishing this result will now be described.

Referring to the same figures, one end of a rock arm 42 is secured by a pin 43 to the reduced end of bushing 40, this end of the arm being clamped between the bushing and the lock nut 41. The opposite end of the arm 42 is rounded along its opposite edges to form a bulbous nose 44 which is received within a slot 45 provided in a lever 46 having an intermediate lug 47 that is pivotally secured by a pin 48 to the underside of a plate 49 that is attached to the pump housing 10. The lever 46 also includes laterally and oppositely extending arms 50 and 51 which are disposed on opposite sides of the nose 44. A solenoid 52 is secured to the underside of the plate 49 and one end of its core 53 contacts a headed screw 54 which is threaded through the arm 50 and may be adjusted in any desired position by a lock nut 55. A solenoid 56 is also secured to the underside of the plate 49 and one end of its core 57 contacts a headed screw 58 that is threaded through the arm 51 and whose adjusted position may be locked by a nut 59.

As illustrated in Fig. 3, the solenoid cores 53 and 57 are shown in retracted position, i. e., no current flowing through either solenoid and the lever 46 is centralized in the position illustrated by means of a pair of balancing springs 60, each of which is mounted in the casing 61 secured to the plate 49, one end of the casing being closed and the opposite end being open to receive a plunger 62 against which the spring 60 bears. As indicated in Fig. 3, the plunger 62 bears against the end of the arm 50, and a similar plunger against the end of the arm 51.

From the foregoing, it will be understood that if the lever 46 is rocked in a counterclockwise direction by the solenoid core 53, as viewed in Fig. 3, the rock arm 42 will be rotated in a clockwise direction, as viewed in Fig. 2, and will therefore move the follower 37 toward the right and increase the loading on the spring 33, thus shifting the valve 21 toward the right and increasing the speed of engine operation. On the other hand, if the lever 46 is rocked in a clockwise direction by the solenoid core 57, as viewed in Fig. 3, the rock arm 42 will be rotated in a counterclockwise direction as viewed in Fig. 2, to thereby unload the spring 33 and permit a shifting of the rotary valve 21 toward the left under the impulse of the weighted levers 32 to thereby decrease the speed of engine operation. Ordinarily, the above conditions will occur, respectively, when the load is increased and decreased on the engine resulting in a corresponding decrease and increase, respectively, in the engine speed.

In Figs. 4 to 6, inclusive, there is illustrated a mechanism whereby differences in speed between the engine and the standard speed, and therefore differences between the generator frequency and the standard frequency are indicated. These differences require repositionings of the valve 21 in the proper direction to restore the standard engine speed. The standard speed may be obtained from an independently driven master clock 63 or any regulator or other device operating at a constant speed, while the speed of the engine is indicated by a synchronous motor driven clock 64 that may be connected by wires 65 to the circuit supplied by the generator. A pinion 66 is driven by the clock 64 and meshes with a gear 67 secured to a sleeve shaft 68 that is journaled in a bearing 69 forming part of a casing 70. The shaft 68 extends within a compartment 71 provided in the casing and is formed as an internal gear 72 forming part of a planetary differential mechanism 73. The standard speed clock 63 drives a shaft 74 that extends through and is journaled in the sleeve shaft 68 and has secured to the end thereof within the compartment 71 a sun gear 75. A pair of planetary gears 76, diametrically related on opposite sides of the sun gear 75, mesh therewith and with the internal gear 72 and each is rotatable on a stub shaft 77 that is carried by a disc 78.

It will be evident that the sun gear 75 constitutes one arm of the differential gear, the internal gear 72 constitutes a second arm, while the disc 78 forms a third arm. Accordingly, so long as the clocks 63 and 64 are characterized by the same speed, the planet gears 76 will simply rotate on their respective stub shafts without effecting any rotary movement of the disc 78. However, if a speed difference exists between the clocks 63 and 64, such difference will cumulatively appear as a rotary movement of the disc 78 and the direction thereof will depend upon whether the speed of the clock 63 is lower or higher than that of the clock 64.

The disc 78 is secured to one end of a shaft 79 that is journaled in and extends through a wall 80 which separates a second compartment 81 from the compartment 71. Within the former compartment a disc 82 is secured to the shaft 79 and a portion of its periphery is recessed as at 83 and the terminals of this recess are defined by shoulders 84 and 85. Normally received within this recess is a nose 86 forming part of a rocker 87 which is pivotally mounted on the wall 80 by a pin 88 and below the pin 88, the rocker carries a pair of mercury switches 89 and 90. One electrode of the switch 89 is connected by a wire 91 to one end of the solenoid 52, while the opposite end of the solenoid is connected by a wire 92 to a line wire 93 which may be connected in the generator circuit or to any independent source of electrical supply. The other electrode of the switch 89 is connected by a wire 94 to a line wire 95. One electrode of the switch 90 is connected by a wire 96 to the line wire 95, and the other electrode of the same switch is connected by a wire 97 to one end of the solenoid 56 whose opposite end is connected by a wire 98 to the line wire 93. Normally the disc 82 and rocker 87 occupy the positions illustrated in Fig. 5, i. e., with the nose 86 extending within the recess 83 and between the shoulders 84 and 85 and in this position the switches 89 and 90 are open.

In describing the operation of my improved control, it will be necessary to make certain assumptions regarding the operating conditions since the latter are capable of many variations. For present purposes, it will be assumed that the governor spring 33 has been primarily adjusted by the screw 39 so that when the engine is one-half loaded the generator connected thereto is capable of maintaining the desired frequency or in other words the engine runs at standard speed. Now, if a full load is applied to the engine, it will be obvious that, unless some compensation is interposed, the engine would slow down so that the generator would operate with a lower frequency than the desired frequency. As a further assumption, it will be considered that under these conditions the engine would run at two per cent below the standard speed so that electric clocks floated on the generator supply circuit would lose time at the rate of one second in every fifty seconds of elapsed time. It will further be assumed that the recess notches 84 and 85 are so spaced with reference to the illustrated mid-position of the rocker nose 86 that a loss in time of two seconds as indicated by the synchronous clock 64 would cause a rotation of the disc 82 through an arc sufficient to engage the shoulder 84 with the nose 86 and so rotate the rocker 87 sufficiently to close the switch 89. This action energizes the solenoid 52 and effects an endwise shift of the solenoid core 53 toward the left as viewed in Fig. 3 and therefore through the rock arm 42 increases the loading on the spring 33 and a shifting of the rotary valve 21 toward the right to the basic governed speed of the engine. It will be observed that, under the assumed condition of a two per cent loss in the engine speed, this loss will have to continue for one hundred seconds of elapsed time before the switch will trip to increase the frequency and stop the loss.

If it is now assumed that, with the governor adjustment compensated as above described, the speed of the prime mover is increased to a point appreciably more than just sufficient to reestablish standard speed and specifically a gain in frequency of two per cent under the full loaded condition, the speed difference thereby exhibited between the clocks 63 and 64 will appear as a rotary movement of the disc 82 in the opposite direction. This action will cause switch 89 to open and close at intervals and will therefore keep the switch on the edge of closure.

If with the parts in the positions just described, the load on the engine should drop to a value which with the given adjustment of the primary adjusting screw 39 causes a gain of two per cent in frequency, the rocker 86 will not be rotated to a position closing the switch 90 until the disc 82 has been rotated through an arc sufficient to engage the recessed shoulder 85 with the rocker nose 86. The time required for this correction under the assumed conditions will be four seconds of differential clock time, i. e., two seconds on each side of the central position of the rocker as illustrated in Fig. 5. At the assumed rate of two per cent gain in speed, the time involved will be two hundred seconds of elapsed time before the solenoid 56 is energized to permit an unloading of the governor spring 33 and a shift of the rotary valve toward the left to decrease the governed speed of the engine.

From the foregoing it will be understood that my improved control enables the engine speed and therefore the generator frequency to be regulated within very narrow limits, specifically one in which it is possible to enable standard household clocks to be floated on the generator system and to be operated with an acceptable degree of accuracy.

It will be further understood that the portion of the control illustrated in Figs. 4 to 6, inclusive, can be utilized to control a plurality of governors as illustrated in Fig. 1, which may be associated with several engines which have their connected generators in parallel on a given system or in a given station. Moreover, it is evident that while in the specific example described two contactors or switches 89 and 90 are employed for increasing and decreasing, respectively, the speed of the prime mover, the control is capable of operation with only one switch. For example, if the primary adjusting screw 39 was arranged to allow a constant loss in the engine speed a single switch could be used to so compensate the governor adjustment as to provide for a predetermined rate of gain until the accumulated loss of differential clock time had been absorbed, or if the screw 39 allowed a constant gain in the engine speed, a single switch could be used to provide for a predetermined rate of loss in such speed until the appropriate time had been absorbed.

In a control of the foregoing character, it is desirable to provide a signal means whereby the operator may be warned of any derangement to the engine before uncontrolled differences between the generator and standard frequencies result in perceptible inaccuracies in clocks floated on the system. In the present instance, this situation is controlled by an arcuate lever 99 which adjacent its upper end (see Figs. 4 and 7) is provided with a slot 100 through which extends a pin 101 that is mounted in a wall of the compartment 81 whereby the lever 99 is arranged for a combination pivoting and sliding movement. The lower end of the lever is formed as a nose 102 which under normal conditions, i. e., with the disc 82 in the position illustrated in Fig. 5, or in either of its limit control positions in which the shoulders 84 and 85 engage the nose 86 bears against a flank of this disc adjacent the periphery thereof and this position is maintained by means of a spring 103 one end of which is secured to the lever and the opposite end to the wall 80. The lever 99 carries a mercury switch 104 one electrode of which is connected by a wire 105 with the line wire 93 and the other electrode is connected by a wire 106 with a lamp 107 which in turn is connected by a wire 108 to the line wire 95. It will be understood that the lamp 107 is generally indicative of any type of signal means that is capable of giving visual or audible warnings in the normal operation of the device.

The lever 99 occupies the position illustrated in Fig. 4 which is one in which the mercury switch 104 is open, and this condition is maintained so long as the engine operates under the control above described. However, if for any reason a speed difference should exist between the clocks 63 and 64 for a time sufficient to rotate the disc 82 through an angle of 180 degrees, then the spring 103 will shift the lever 99 to the position illustrated in Fig. 7. This action is permitted by reason of the fact that the lever nose 102 enters the recess 83 in its then displaced position. This shift of the lever 99 will accordingly close the mercury switch 104 and operate the signal 107. After the difficulty in the engine has been corrected and assuming that the lever 99 is occupying the position illustrated in Fig. 7, the latter can be returned to the original position shown in Fig. 4 by means of a plunger 109 slidably mounted through the top wall of the compartment 81. The lower end of this plunger may be appropriately shaped to fit the top edge of the lever 99 so that when the plunger is moved downward the lever will be rocked to the position shown in Fig. 4 thus opening the switch 104. Thereafter, the disc 82 may be appropriately rotated until the recess 83 thereof is properly related to the rocker 87 as illustrated in Fig. 5.

I claim as my invention:

1. In mechanism for regulating the frequency of a generator subject to varying loads by adjusting its speed to achieve an average speed substantially equal to a reference speed, the generator being driven by a prime mover under the control of a governor loaded by a spring adjusted to substantially maintain the reference speed at a predetermined load, master speed means providing the reference speed, means operating in synchronism with the generator, means responsive to unidirectional speed differences between the reference speed and synchronous means, and means for varying the adjustment of the spring to compensate for departures from the reference speed comprising an adjustable member engageable with the spring, and an electric circuit including switch means having a lost motion operating connection with said responsive means and being open during periods of a predetermined limiting speed difference and closed by the responsive means when the difference is exceeded and a solenoid having a core for controlling the movement of the member.

2. In mechanism for regulating the frequency of a generator subject to varying loads by adjusting its speed to achieve an average speed substantially equal to a reference speed, the generator being driven by a prime mover under the control of a governor loaded by a spring adjusted to substantially maintain the reference speed at a predetermined load, master speed means providing the reference speed, means operating in synchronism with the generator, differential gear means, the first and second arms of the gear being driven by the master speed and synchronous means, respectively, and means for varying the adjustment of the spring to alter the engine speed by compensating for departures from the reference speed comprising an adjustable member engageable with the spring, an electric circuit including switch means open during periods of a predetermined limiting speed difference and a solenoid having a core for controlling the movement of the member, and a trip driven by the third arm of the gear means for closing the switch means when the difference is exceeded.

3. In mechanism for regulating the frequency of a generator subject to varying loads by adjusting its speed to achieve an average speed substantially equal to a reference speed, the generator being driven by a prime mover under the control of a governor loaded by a spring adjusted to substantially maintain the reference speed at a predetermined load, master speed means providing the reference speed, means operating in synchronism with the generator, differential gear means, the first and second arms of the gear being driven by the master speed and synchronous means, respectively, and means for varying the adjustment of the spring to alter the engine speed by compensating for departures from the reference speed comprising an adjustable member engageable with the spring, an electric circuit having a pair of parallel branches each including switch means open during periods of a predetermined limiting speed difference above and below the reference speed and a solenoid having a core for controlling the movement of the member, and a trip driven by the third arm of the gear means for closing the switch means, respectively, when the difference is exceeded in either direction.

4. Mechanism for regulating the frequency of a generator subject to varying loads by adjusting its speed to achieve an average speed substantially equal to a reference speed, the generator being driven by a prime mover under the control of a governor, comprising primary means adjustably related to the governor and set to substantially maintain the reference speed at a predetermined load, master speed means providing the reference speed, means operating in synchronism with the generator, means responsive to speed differences between the reference speed and synchronous means including a member movable in either of two directions through a predetermined range dependent upon whether the reference speed is higher or lower than the speed of the synchronous means, and secondary means adjustive to the governor and controlled by the member after a predetermined movement thereof in either direction beyond said range for altering the prime mover speed.

5. Mechanism for regulating the frequency of a generator subject to varying loads by adjusting its speed to achieve an average speed substantially equal to a reference speed, the generator being driven by a prime mover under the control of a governor, comprising primary means adjustably related to the governor and set to substantially maintain the reference speed at a predetermined load, master speed means providing the reference speed, means operating in synchronism with the generator, means responsive to speed differences between the reference speed and synchronous means including a member movable in either of two directions dependent upon whether the reference speed is higher or lower than the speed of the synchronous means, and secondary means adjustive to the governor and controlled by the member after a predetermined movement thereof in either direction for altering the prime mover speed, the adjusting element of the primary means being carried by the directly adjusting element of the secondary means.

6. Mechanism for regulating the frequency of an engine driven generator subject to varying loads by adjusting its speed to achieve an average speed substantially equal to a reference speed, comprising throttle means for the engine, a spring and a centrifugal governor mutually acting to position the throttle means, primary means loading the spring to maintain the throttle means in substantially a reference speed position at a predetermined load on the engine, master speed means providing the reference speed, means operating in synchronism with the generator, means responsive to speed differences between the reference speed and synchronous means including a member movable in either of two directions dependent upon whether the reference speed is higher or lower than the speed of the synchronous means, and secondary means adjustive to the spring and controlled by the member after a predetermined movement thereof in either direction for altering the engine speed.

7. Mechanism for regulating the frequency of an engine driven generator subject to varying loads by adjusting its speed to achieve an average speed substantially equal to a reference speed, comprising throttle means for the engine, a spring and a centrifugal governor mutually acting to position the throttle means, a primary screw adjustable to load the spring to maintain the throttle means in substantially a reference speed position at a predetermined load on the engine, master speed means providing the reference speed, means operating in synchronism with the generator, means responsive to speed differences between the reference speed and synchronous means including a member movable in either of two directions dependent upon whether the reference speed is higher or lower than the speed of the synchronous means, and a secondary screw adjustive to the spring and controlled by the member after a predetermined movement thereof in either direction for altering the engine speed.

8. Mechanism for regulating the frequency of an engine driven generator subject to varying loads by adjusting its speed to achieve an average speed substantially equal to a reference speed, comprising throttle means for the engine, a spring and a centrifugal governor mutually acting to position the throttle means, a primary screw adjustable to load the spring to maintain the throttle means in substantially a reference speed position at a predetermined load on the engine, master speed means providing the reference speed, means operating in synchronism with the generator, means responsive to speed differences between the reference speed and synchronous means including a member movable in either of two directions dependent upon whether the reference speed is higher or lower than the speed of the synchronous means, and a secondary screw adjustive to the spring and controlled by the member after a predetermined movement thereof in either direction for altering the engine speed, the primary screw being threaded through the secondary screw.

9. Mechanism for regulating the frequency of an engine driven generator subject to varying loads by adjusting its speed to achieve an average speed substantially equal to a reference speed, comprising throttle means for the engine, a spring and a centrifugal governor mutually acting to position the throttle means, a primary screw adjustable to load the spring to maintain the throttle means in substantially a reference speed position at a predetermined load on the engine, master speed means providing the reference speed, means operating in synchronism with the generator, means responsive to speed differences between the reference speed and synchronous means including a member movable in either of two directions dependent upon whether the reference speed is higher or lower than the speed of the synchronous means, and a secondary screw adjustive to the spring and controlled by the member after a predetermined movement thereof in either direction for altering the engine speed, the primary screw being connected to and extending beyond the secondary screw in operative relation to the spring.

10. Mechanism for regulating the frequency of an engine driven generator subject to varying loads by adjusting its speed to achieve an average speed substantially equal to a reference speed, comprising throttle means for the engine, a spring and a centrifugal governor mutually acting to position the throttle means, primary means loading the spring to maintain the throttle means in substantially a reference speed position at a predetermined load on the engine, master speed means providing the reference speed, means operating in synchronism with the generator, means responsive to speed differences between the reference speed and synchronous means due to an increase or decrease in engine speed relative to the reference speed, and secondary means controlled by the responsive means and arranged to independently vary the loading on the spring to alter the engine speed when a predetermined speed difference is exceeded in either direction.

11. Mechanism for regulating the frequency of an engine driven generator subject to varying loads by adjusting its speed to achieve an average speed substantially equal to a reference speed, comprising throttle means for the engine, a spring and a centrifugal governor mutually acting to position the throttle means, primary means loading the spring to maintain the throttle means in substantially a reference speed position at a predetermined load on the engine, master speed means providing the reference speed, means operating in synchronism with the generator, means responsive to unidirectional speed differences between the master speed and synchronous means, and secondary means for varying the loading of the spring to alter the engine speed by compensating for departures from the reference speed comprising an electric circuit including switch means open during periods of a predetermined limiting speed difference and closed by the responsive means when the difference is exceeded and a solenoid having a core actuatingly related to the spring.

12. Mechanism for regulating the frequency of an engine driven generator subject to varying loads by adjusting its speed to achieve an average speed substantially equal to a reference speed, comprising throttle means for the engine, a spring and a centrifugal governor mutually acting to position the throttle means, primary means loading the spring to maintain the throttle means in substantially a reference speed position at a predetermined load on the engine, master speed means providing the reference speed, means operating in synchronism with the generator, means responsive to speed differences between the reference speed and synchronous means due to an increase or decrease in engine speed relative to the reference speed, and secondary means controlled by the responsive means for varying the loading of the spring to alter the engine speed by compensating for departures from the reference speed comprising an electric circuit having a pair of parallel branches each including switch means open during periods of a predetermined limiting speed difference above and below the reference speed and a solenoid having a core actuatingly related to the spring, the switch means closing, respectively, when the difference is exceeded in either direction.

13. Mechanism for regulating the frequency of an engine driven generator subject to varying loads by adjusting its speed to achieve an average speed substantially equal to a reference speed, comprising throttle means for the engine, a spring and a centrifugal governor mutually acting to position the throttle means, primary means loading the spring to maintain the throttle means in substantially a reference speed position at a predetermined load on the engine, master speed means providing the reference speed, means operating in synchronism with the generator, differential gear means, the first and second arms of the gear being driven by the master speed and synchronous means, respectively, and secondary means for varying the adjustment of the spring to alter the engine speed by compensating for departures from the reference speed comprising an adjustable member engageable with the spring, an electric circuit including switch means open during periods of a predetermined limiting speed difference and a solenoid having a core actuatingly related to the member, and a trip driven by the third arm of the gear means for closing the switch means when the difference is exceeded.

14. Mechanism for regulating the frequency of an engine driven generator subject to varying loads by adjusting its speed to achieve an average speed substantially equal to a reference speed, comprising throttle means for the engine, a spring and a centrifugal governor mutually acting to position the throttle means, primary means loading the spring to maintain the throttle means in substantially a reference speed position at a predetermined load on the engine, master speed means providing the reference speed, means operating in synchronism with the generator, differential gear means, the first and second arms of the gear being driven by the master speed and synchronous means, respectively, and secondary means for varying the adjustment of the spring to alter the engine speed by compensating for departures from the reference speed comprising an adjustable member engageable with the spring, an electric circuit having a pair of parallel branches each including switch means open during periods of a predetermined limiting speed difference above and below the reference speed and a solenoid having a core actuatingly related to the member, and a trip driven by the third arm of the gear means for closing the switch means, respectively, when the difference is exceeded in either direction.

15. Mechanism for regulating the frequency of a prime mover driven generator subject to varying loads by adjusting its speed to achieve an average speed substantially equal to a reference speed, the prime mover being controlled by a governor set to substantially maintain the reference speed at a predetermined load, comprising master speed means providing the reference speed, means operating in synchronism with the generator, means responsive to speed differences between the reference speed and synchronous means including a member movable in either of two directions dependent upon whether the reference speed is higher or lower than the speed of the synchronous means, means adjustive to the governor and controlled by the member after a predetermined movement thereof in either direction for altering the prime mover speed, and signal means responsive to a predetermined movement of the member in excess of the first named movement.

16. In mechanism for regulating the frequency of a generator subject to varying loads by adjusting its speed to achieve an average speed substantially equal to a reference speed, the generator being driven by a prime mover under the control of a governor loaded by a spring adjusted to substantially maintain the reference speed at a predetermined load, master speed means providing the reference speed, means operating in synchronism with the generator, means responsive to speed differences between the reference speed and synchronous means, and means for varying the adjustment of the spring to compensate for departures from the reference speed comprising an adjustable member engageable with the spring, and an electric circuit including switch means open during periods of a predetermined limiting speed difference and closed by the responsive means when the difference is exceeded and a solenoid having a core for controlling the movement of the member and a second electric circuit in parallel with the first circuit including signal means and a switch closed by the responsive means upon the occurrence of a speed difference in excess of the first named difference.

CARROLL R. ALDEN.